US012332770B2

United States Patent
Shi et al.

(10) Patent No.: US 12,332,770 B2
(45) Date of Patent: Jun. 17, 2025

(54) AUTOMATED LOCATING OF GUI ELEMENTS DURING TESTING USING MULTIDIMENSIONAL INDICES

(71) Applicant: International Business Machines Corporation, Armonk, NY (US)

(72) Inventors: Jin Shi, Ningbo (CN); Lu Chen, Ningbo (CN); Tang Xue Bo, Ningbo (CN); Ping Yang, Ningbo (CN); Meng Qi Chen, Ningbo (CN); Rui Na Liu, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 17/360,390

(22) Filed: Jun. 28, 2021

(65) Prior Publication Data
US 2022/0413997 A1    Dec. 29, 2022

(51) Int. Cl.
*G06F 11/3668* (2025.01)
*G06F 3/0485* (2022.01)
(Continued)

(52) U.S. Cl.
CPC ........ *G06F 11/3688* (2013.01); *G06F 3/0485* (2013.01); *G06F 11/3698* (2025.01);
(Continued)

(58) Field of Classification Search
CPC ............ G06F 11/3688; G06F 11/3664; G06F 3/0485; G06T 7/70; G06T 2207/20081; G06N 20/00
See application file for complete search history.

(56) References Cited

U.S. PATENT DOCUMENTS

| 9,424,167 B2 | 8/2016 | Lee |
| 9,846,634 B2 | 12/2017 | Ji |

(Continued)

FOREIGN PATENT DOCUMENTS

IN    202021029207 A    7/2020

OTHER PUBLICATIONS

Hu, Gang, Linjie Zhu, and Junfeng Yang. "AppFlow: using machine learning to synthesize robust, reusable UI tests." Proceedings of the 2018 26th ACM Joint Meeting on European Software Engineering Conference and Symposium on the Foundations of Software Engineering. 2018. (Year: 2018).*

(Continued)

*Primary Examiner* — Bradley A Teets
*Assistant Examiner* — Joanne G Macasiano
(74) *Attorney, Agent, or Firm* — Jordan T. Schiller

(57) ABSTRACT

Disclosed are techniques for automated locating of user interface elements during graphical user interface testing. When a graphical user interface (GUI) is received for testing, images of the GUI are inputted to a machine learning algorithm, where image processing techniques are applied to identify groups of user interface elements and their constituent elements. Multi-dimensional index values are assigned to groups and elements corresponding to their positions within the GUI. Automated testing of the user interface elements of the GUI is performed by locating the user interface elements by their index values. If an element is not found, a scrolling technique is applied to generate an expanded virtual GUI of one or more groups of user interface elements, and the machine learning algorithm refreshes the index values using the expanded virtual GUI.

15 Claims, 8 Drawing Sheets

(51) Int. Cl.
*G06F 11/3698* (2025.01)
*G06N 20/00* (2019.01)
*G06T 7/70* (2017.01)

(52) U.S. Cl.
CPC .............. *G06N 20/00* (2019.01); *G06T 7/70* (2017.01); *G06T 2207/20081* (2013.01)

(56) References Cited

U.S. PATENT DOCUMENTS

| | | | |
|---|---|---|---|
| 11,150,861 B1* | 10/2021 | Thomas | H04N 7/152 |
| 2006/0085764 A1* | 4/2006 | Klementiev | G06F 11/3696 |
| | | | 714/E11.207 |
| 2009/0210749 A1* | 8/2009 | Hayutin | G06F 11/3688 |
| | | | 714/38.1 |
| 2014/0253559 A1 | 9/2014 | Li | |
| 2014/0366005 A1 | 12/2014 | Kozhuharov | |
| 2015/0339213 A1* | 11/2015 | Lee | G06F 3/0484 |
| | | | 717/125 |
| 2017/0177587 A1* | 6/2017 | Cai | G06F 16/90348 |
| 2018/0210824 A1* | 7/2018 | Kochura | G06F 11/3696 |
| 2020/0117577 A1* | 4/2020 | Saxena | G06F 18/217 |
| 2020/0159647 A1* | 5/2020 | Puszkiewicz | G06F 11/3664 |
| 2021/0081309 A1* | 3/2021 | Golubev | G06F 11/0772 |
| 2022/0114044 A1* | 4/2022 | Singh | G06F 11/0736 |

OTHER PUBLICATIONS

Reiss, Steven P. "Seeking the user interface." Proceedings of the 29th ACM/IEEE international conference on Automated software engineering. 2014. (Year: 2014).*

White, Thomas D., Gordon Fraser, and Guy J. Brown. "Improving random GUI testing with image-based widget detection." Proceedings of the 28th ACM SIGSOFT international symposium on software testing and analysis. 2019. (Year: 2019).*

Authors, et al., "A Relationship Based Automation Test Method", IP.com Prior Art Database Technical Disclosure, IP.com No. IPCOM000177239D, Dec. 7, 2008, 8 pgs., <https://ip.com/IPCOM/000177239>.

Authors, et al., "Method for Reusing English GUI Automation Scripts in Multilingual Environment", IP.com Prior Art Database Technical Disclosure, IP.com No. IPCOM000152916D, May 18, 2007, 9 pgs., <https://ip.com/IPCOM/000152916>.

Hassan, et al., "Extraction and Classification of User Interface Components from an Image", International Journal of Pure and Applied Mathematics, 2018, vol. 118, No. 24, 16 pgs., <https://acadpubl.eu/hub/2018-118-24/4/694.pdf>.

Sun, et al., "UI Components Recognition System Based On Image Understanding", 2020 IEEE 20th International Conference on Software Quality, Reliability and Security Companion (QRS-C), DOI 10.1109/QRS-C51114.2020.00022, © 2020 IEEE, 2020, 7 pgs.

* cited by examiner

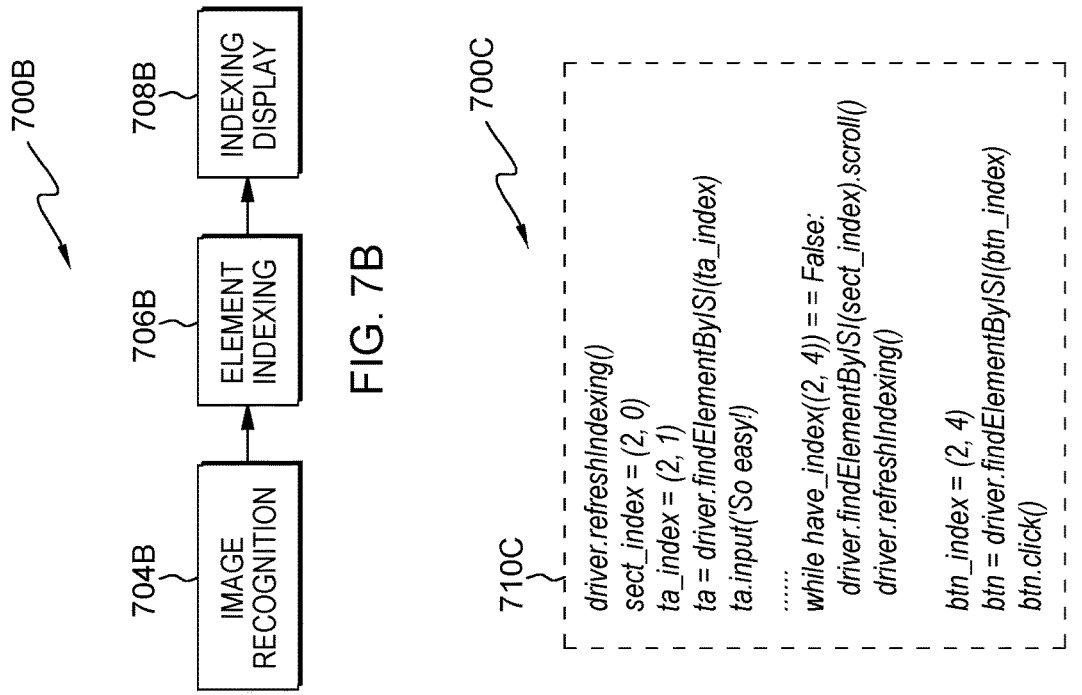
FIG. 7B
FIG. 7C
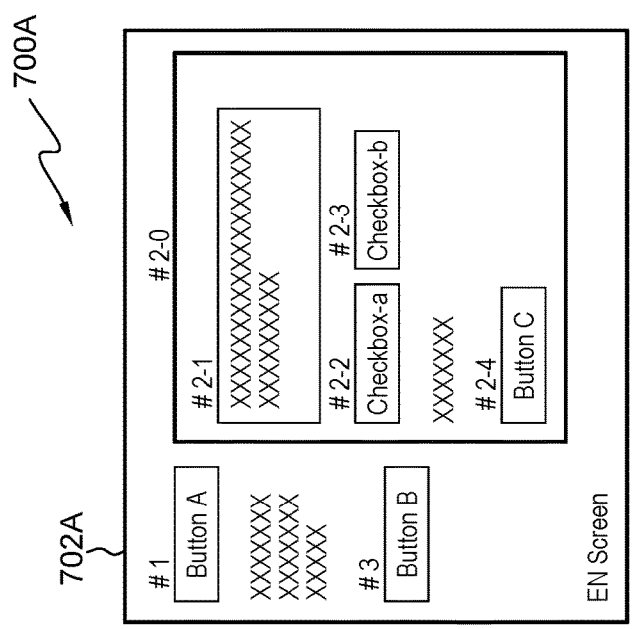
FIG. 7A

AUTOMATED LOCATING OF GUI ELEMENTS DURING TESTING USING MULTIDIMENSIONAL INDICES

BACKGROUND

The present invention relates generally to the field of graphical user interfaces (or GUIs), and more particularly to locating GUI elements during automated testing of GUI interfaces.

The graphical user interface (or GUI) is a form of user interface (UI) that allows users to interact with electronic devices through graphical icons and audio indicators such as primary notation, instead of text-based user interfaces, typed command labels or text navigation. The actions in a GUI are typically performed through direct manipulation of the graphical elements, which may include text labels.

Computer vision is an interdisciplinary scientific field describing how computers can acquire high-level understanding from digital images or videos. From the perspective of engineering, it aims to understand and automate tasks that the human visual system can perform. Computer vision tasks typically include methods for acquiring, processing, analyzing and understanding digital images, and extraction of high-dimensional data from the real world in order to output numerical or symbolic information, e.g. in the forms of decisions. Object detection is a computer technology related to computer vision and image processing that concerned with detecting instances of semantic objects of a certain class (such as humans, buildings, or cars) in digital images and videos.

Machine learning (or ML) describes the study of computer algorithms that improve automatically through experience and with the use of data. It is viewed as a subfield of artificial intelligence. Machine learning algorithms construct a model based on sample data, known as "training data", in order to generate predictions or decisions without being explicitly programmed to do so.

In deep [machine] learning, a convolutional neural network (CNN, or ConvNet) is a class of deep neural network, most frequently applied to analyze visual imagery. They are sometimes also referred to as shift invariant or space invariant artificial neural networks (SIANN), based on the shared-weight architecture of the convolution kernels or filters that slide along input features and provide translation equivariant responses known as feature maps. Counter-intuitively, most convolutional neural networks are only equivariant, instead of invariant, to translation. CNNs have usage in image and video recognition, recommender systems, image classification, image segmentation, medical image analysis, natural language processing, brain-computer interfaces, and financial time series.

SUMMARY

According to an aspect of the present invention, there is a method, computer program product and/or system that performs the following operations (not necessarily in the following order): (i) receiving a first graphical user interface, including a first plurality of graphical user interface elements; (ii) receiving a machine learning model trained to determine positions of groups of user interface elements and their corresponding constituent user interface elements in an image of a graphical user interface; (iii) indexing, into a first position mapping table, each user interface element of the first plurality of graphical user interface elements with a multidimensional index value corresponding to at least three dimensions based, at least in part, on the machine learning model, where at least one dimension of the at least three dimensions corresponds to grouping status within a hierarchical group of elements; and (iv) testing the first graphical user interface with a first automated graphical user interface test, where the first automated graphical user interface test locates graphical user interface elements for testing based, at least in part, on the first position mapping table.

BRIEF DESCRIPTION OF THE DRAWINGS

FIG. 7A is a screenshot view generated by a second embodiment method;

FIG. 7B is a flowchart showing the second embodiment method;

FIG. 7C is a screenshot view showing a block of code corresponding to the second embodiment method;

DETAILED DESCRIPTION

Figure 1:
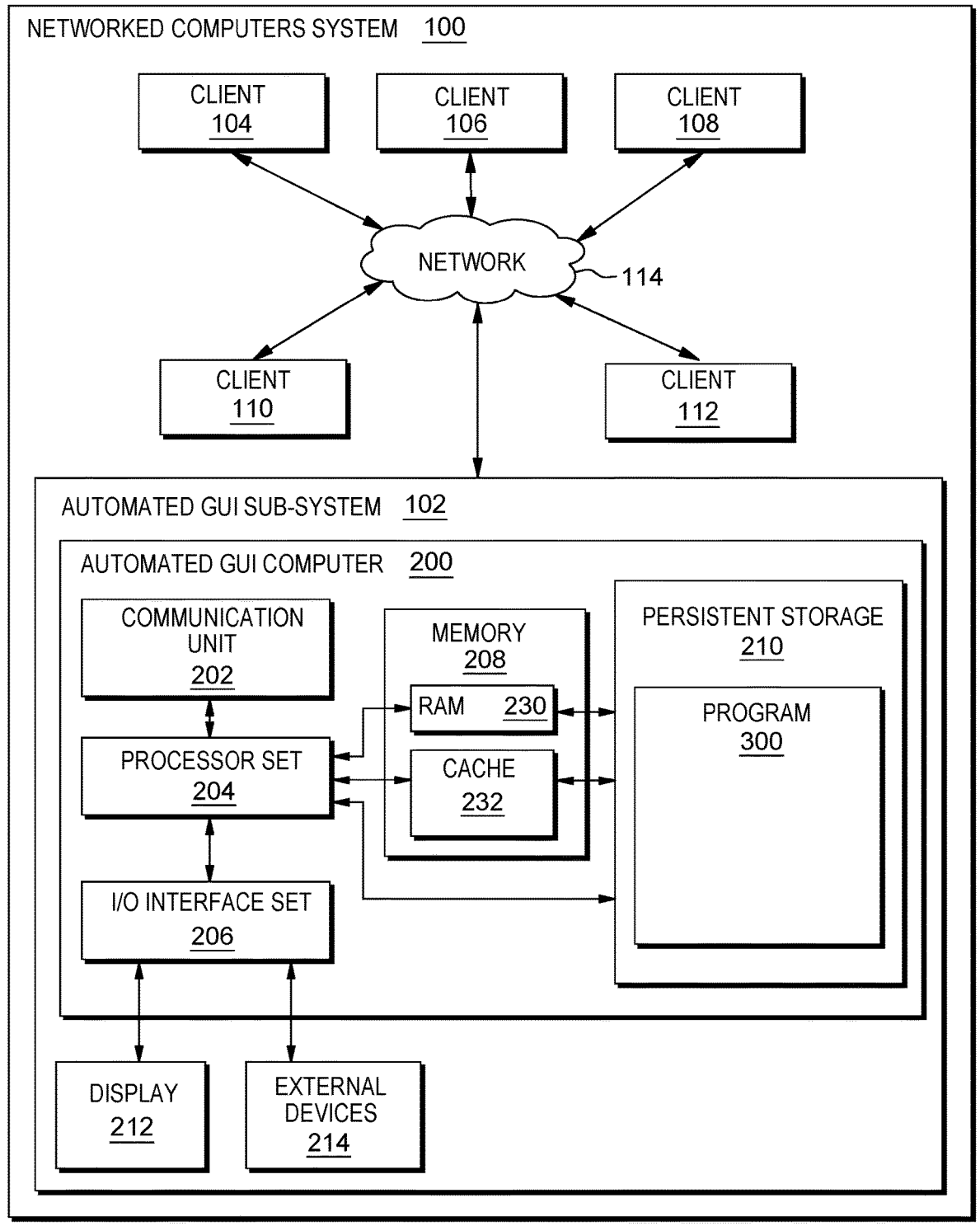
FIG. 1 is a block diagram view of a first embodiment of a system according to the present invention.

Some embodiments of the present invention are directed to techniques for automated locating of user interface elements during graphical user interface testing. When a graphical user interface (GUI) is received for testing, images of the GUI are inputted to a machine learning algorithm, where image processing techniques are applied to identify groups of user interface elements and their constituent elements. Multi-dimensional index values are assigned to groups and elements corresponding to their positions within the GUI. Automated testing of the user interface elements of the GUI is performed by locating the user interface elements by their index values. If an element is not found, a scrolling technique is applied to generate an expanded virtual GUI of one or more groups of user interface elements, and the machine learning algorithm refreshes the index values using the expanded virtual GUI.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: automated GUI subsystem 102 (sometimes herein referred to, more simply, as subsystem 102); client subsystems 104, 106, 108, 110, 112; and communication network 114. Automated GUI subsystem 102 includes: automated GUI computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
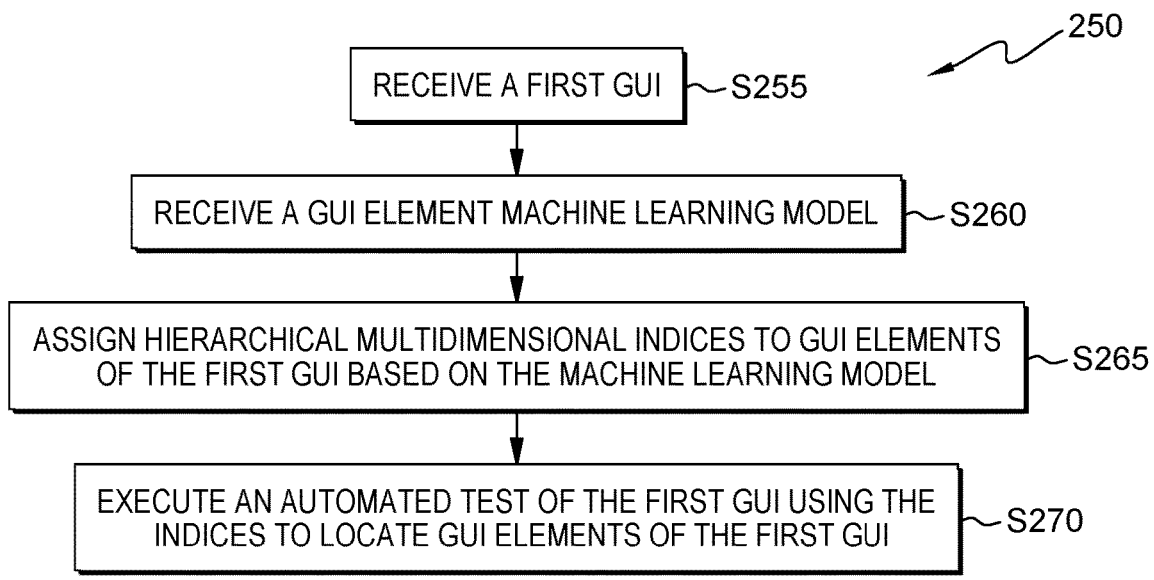
FIG. 2 is a flowchart showing a first embodiment method performed, at least in part, by the first embodiment system.
Figure 3:
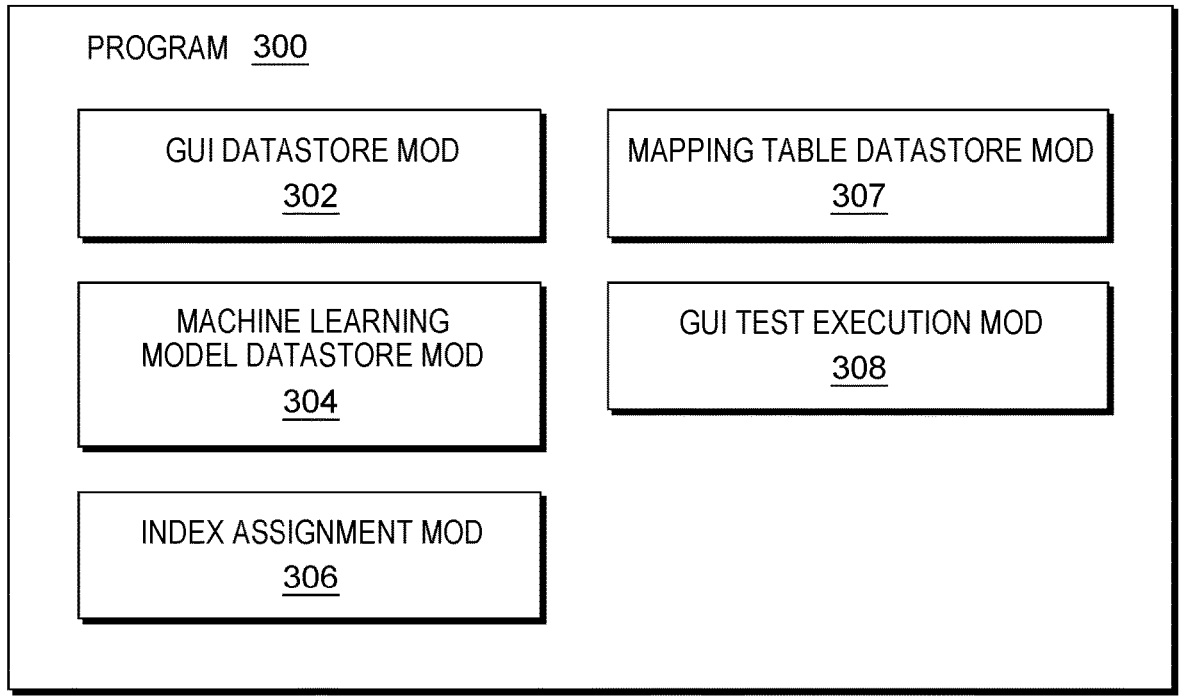
FIG. 3 is a block diagram showing a machine logic (for example, software) portion of the first embodiment system.

As shown in FIG. 1, networked computers system 100 is an environment in which an example method according to the present invention can be performed. As shown in FIG. 2, first flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Figure 4:
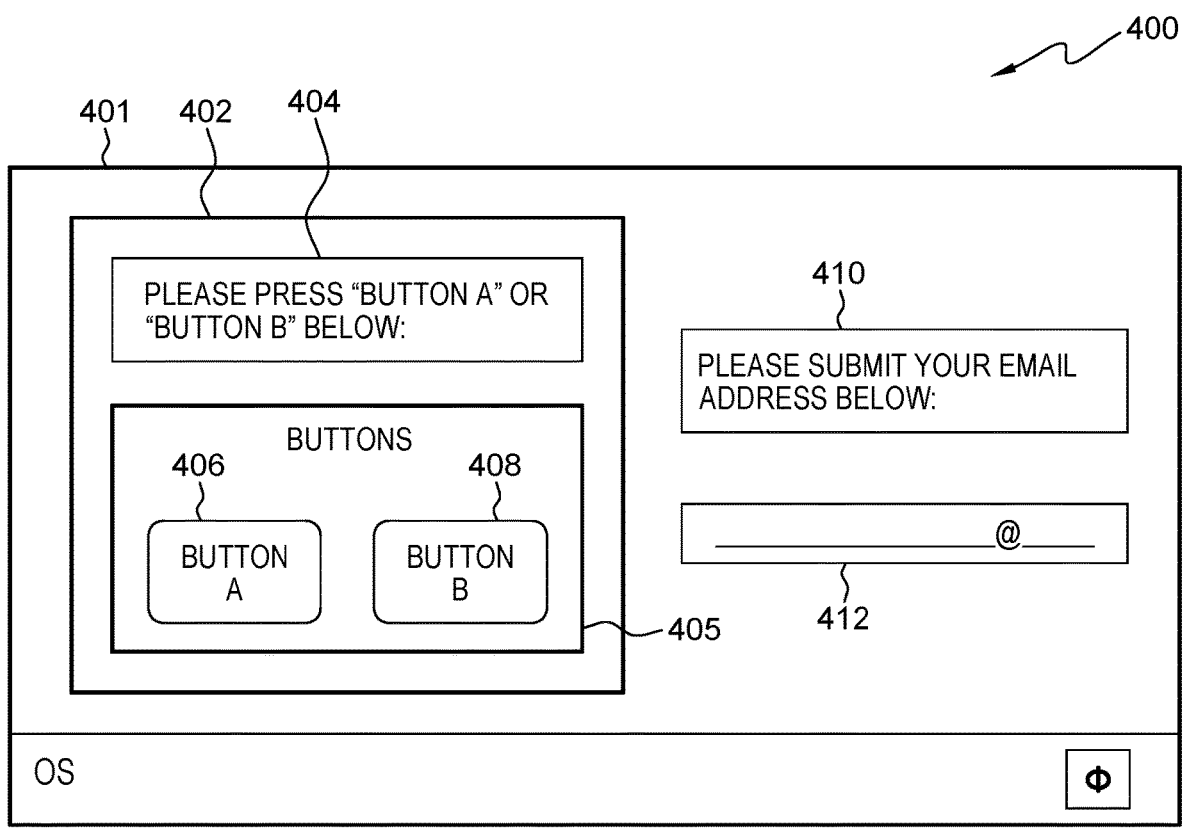
FIG. 4 is a screenshot view generated by the first embodiment system.

Processing begins at operation S255, where GUI datastore module ("mod") 302 receives a first GUI. In this simplified embodiment, the first GUI, shown in screenshot 400 of FIG. 4, includes the following elements: (i) first GUI 401; (ii) GUI element group 402; (iii) text box 404; (iv) GUI buttons element sub-group 405; (v) button A 406; (vi) button B 408; (vii) text box 410; and (viii) text input box 412.

Processing proceeds to operation S260, where machine learning model datastore mod 304 receives a GUI element machine learning model. In this simplified embodiment, the GUI element machine learning model is trained for image recognition to detect positions of groups of GUI elements and constituent elements. More specifically, the GUI element machine learning model, when provided an image of a GUI, analyzes the image to determine hierarchical groups of GUI elements, including their positions as well as the positions of GUI elements within the hierarchical groups, with a first group, the top of the hierarchy, comprising the GUI itself, and sub-groups where appropriate based on the GUI in the image, including nested sub-groups.

Processing proceeds to operation S265, where index assignment mod 306 assigns indices to GUI elements of the first GUI based on the GUI element machine learning model. In this simplified embodiment, index assignment mod 306 provides an image of the first GUI. For each GUI element of the first GUI identified by GUI element machine learning model, index assignment mod 306 assigns an index of three dimensions: (i) the first dimension corresponds to a horizontal position on the first GUI; (ii) the second dimension corresponds to a vertical position on the first GUI; and (iii) the third dimension corresponds to hierarchical grouping of the GUI elements. In this simplified embodiment, an index describing more than one dimension constitutes a multidimensional index. In the index, the first two dimensions, the horizontal and vertical position of a GUI element on the first GUI, are described by the order of the number assigned, with numbers being assigned from left to right, top to bottom of the first GUI, with the lowest number assigned to the left-most, top-most GUI element and the highest number assigned to the right-most, bottom-most elements. When a group of GUI elements is encountered, the entire group of GUI elements is assigned a number as if they were a single GUI element, and the index for the group and its constituent GUI elements is assigned an additional index value corresponding to left to right, top to bottom position within the group, with the group itself assigned the lowest number in this additional index. This continues where sub-groups exist within a given group, and further sub-groups within those sub-groups, where each sub-group is assigned an index value for the whole sub-group, and another additional index value is assigned for the sub-group and its constituent GUI elements. The third dimension, hierarchical grouping of the GUI elements, is described by the number of additional index values assigned to a GUI element or group of GUI elements beyond the first index value.

In this simplified example embodiment, index assignment mod 306 assigns the following indices to the GUI elements of the first GUI: (i) first GUI 401 has an index of [0], based on being the top group of the hierarchy; (ii) GUI element group 402 has an index of [1,0], corresponding to the first GUI element or group in the screen when processed in a left to right, top to bottom order indicative above; (iii) text box 404, the first GUI element within GUI element group 402 based on the above order, is assigned the index [1,1]; (iv) GUI buttons element sub-group 405, corresponding to a GUI element grouping, instead of simply a GUI element, next in the order within GUI element group 402, is assigned the index [1,2,0]; (v) button A 406, the first GUI element or GUI element grouping in the above order within GUI button element group 405, is assigned the index [1,2,1]; (vi) button B 408, the next GUI element or GUI element group in the order within GUI button element group 405, is assigned the index [1,2,2]; (vii) text box 410, which GUI element machine learning model determined to be part of neither GUI element group 402 nor GUI button elements group 405, but within first GUI 401, is assigned the index [2]; and (viii) text input box 412, like text box 410, was determined by GUI element machine learning model to be part of neither GUI element group 402 nor GUI button elements group 405, but within first GUI 401, is assigned the index [3]. When a GUI element or GUI element group is assigned an index, an entry is stored, in a mapping table stored in mapping table datastore mod 307, for the GUI element or GUI element group with a corresponding set of coordinates describing the boundaries of the GUI element or GUI element group on the first GUI screen.

To use button A 406 as an example, with the assigned index is [1,2,1], the first digit of the index, the leftmost digit, indicates position within the top-most group in the hierarchy of groups within the first GUI, which is shown as first GUI 401. The second digit of the index, the middle digit, indicates position within the next group lower in the hierarchy of which it belongs, which is shown as GUI element group 402. The third and final digit of this index, the rightmost digit, indicates position within the next group lower in the hierarchy within GUI element group 402 and first GUI 401, shown as GUI buttons element group 405. GUI elements or groups of GUI elements are assigned a unique index value within a given group, so no two GUI elements or groups of GUI elements within a given group have the same index value for that group.

In some alternative embodiments, the index further includes another value corresponding to a version number representative of changes to the first GUI over time, with increasing version numbers corresponding to subsequent changes to the first GUI from an initial version or state. In yet further alternative embodiments, the index for a given GUI element further includes two boolean attributes: (i) a first attribute corresponding to if the GUI element is found in the current mapping; and (ii) a second attribute corresponding to if the GUI element is visible in the current GUI screen of the first GUI. In some alternative embodiments, index values are assigned based on any set of orders (such as bottom to top, right to left, etc.).

Processing proceeds to operation S270, where GUI test execution mod 308 executes an automated test of the first GUI using the indices to locate GUI elements of the test GUI. In this simplified embodiment, GUI test execution mod 308 includes a set of machine language instructions for causing a computer processor to simulate a plurality of user inputs into the first GUI, where the set of machine language instructions locates GUI elements of the first GUI for simulated user interaction by querying the mapping table stored in mapping table datastore mod 307, using the assigned indices, to retrieve coordinates for simulated interaction with a given GUI element, such as a mouse click or a touchscreen touch interaction with a button, such as button A 406. In some alternative embodiments, when the automated test attempts to query an index value that is expected to be present in the mapping table but was not indexed when a given GUI was indexed (for example, when some GUI elements cannot be present on the screen due to length changes resulting from translating a GUI in a first language into a second language, leading to their absence from indexing), a scrolling technique is utilized to generate a virtual mapping of the group of GUI elements of which the expected index value is expected to belong to, with the virtual mapping scrolled in one or more directions to reveal other GUI elements of the group, and a virtual mapping of the given group expanded to reveal the other GUI elements not previously visible. The GUI is then indexed again, accounting for the virtual mapping, and the mapping table is updated.

III. Further Comments and/or Embodiments

Some embodiments of the present invention recognize the following facts, potential problems and/or potential areas for improvement with respect to the current state of the art: (i) in graphical user interface automation tests, one of the biggest challenges is to locate the UI elements; (ii) furthermore, building GUI automation scripts for multilingual environments raises a higher demand because using hard-code text to locate element is not feasible anymore; (iii) current locating methods all have limitations; (iv) one is to use element path/properties, such as Selenium; (v) basically works well for browser based apps; (v) to native apps, as there is no path and few properties to leverage, using text to locate is inevitable; (vi) in a multilingual scenario, one solution is to leverage a translation mapping that is consistent with current GUI, so as to translate the locator based on UI strings in run time, which relies on a full control of UI string resource bundles and takes too much effort to maintain the mapping; (vii) another technique relies on screen captures, such as Sikuli; (viii) this is not robust for minor layout changes or resolution inconsistency; (ix) in multilingual scenarios, it's scarcely possible to locate adjacent elements which have similar text length by adjusting the similarity threshold; (x) another technique is to use positions, such as autoit; (xi) this is not robust for window movements, minor layout changes, or resolution inconsistency; and (xii) in multilingual scenarios, the position will change because of translation expansion (some languages result in longer or shorter text elements within the user interface).

Some embodiments of the present invention recognize the following facts, potential problems and/or potential areas for improvement with respect to the current state of the art: (i) graphical user interface automation test is widely applied in regression tests, cross-platform tests and translation verification tests; (ii) to ensure the automation scripts are robust to run anytime and anywhere, locating the element uniquely and stably is one of the big challenges; (iii) in particular, almighty text-based locator becomes not that easy-to-use in the area of translation verification test; (iv) existing locating solutions have their limitations; (v) using element properties and paths, which is more applicable for web-based than native apps; (vi) for native apps, using text-based locator is inevitable, while maintaining a translation mapping for locators takes too much effort; (vii) using element image comparison, which is not robust for minor layout changes or resolution inconsistencies, let alone the change caused by translation; and (viii) using element positions, which has similar limitations with the second solution.

Some embodiments of the present invention may include one, or more, of the following operations, features, characteristics and/or advantages: (i) leverage image understanding (or image processing) to identify interactive elements in the UI and index them by hierarchy flow serial numbers; (ii) this number is dynamic and updated with changes to the UI, or four-dimensional indexing; (iii) this new locating technique is aimed to locate elements by the hierarchy relative location of the element image, rather than by simply comparing the element image or by a fixed position; (iv) the one-to-one correspondence for elements during development and reproduction is kept by the above mentioned serial numbers, and the actual position of element is retrieved using the serial numbers in runtime; (v) locate GUI elements by four dimensional indexing based on image recognition; (vi) left to right, up down numbering mechanism represents the first two dimensions; (vii) hierarchy numbering mechanism for elements in element groups represents the third dimension; (viii) time as the fourth dimension; (ix) the fourth dimension, time, represents that the serial number is dynamic and updated with the UI change, that's to say, the serial number for the same element might be changed in different operation context; (x) maintained by an indexing refresh mark in script, which will cause re-indexing during running of the script; (xi) the actual element position will be calculated based on the four dimensional index in runtime; and (xii) an exploratory operation is proposed to overcome the UI change caused by translation.

Some embodiments of the present invention may include one, or more, of the following operations, features, characteristics and/or advantages: (i) one advantage is an easy to use, efficient, robust and widely applicable elements locating method, which dramatically improves development efficiency and execution stability; (ii) the locator is highlighted with a serial number on the fly and very easy to use; (iii) this technique provides a more efficient solution to meet multilingual requirements; (iv) that means, not relying on text locator and source-translation mapping; (v) the element location is determined based on the GUI at runtime by serial number-position mapping; (vi) the locator herein solves the above noted limitations, applicable for most GUI automation tests, such as regression test, cross-platform test, translation verification test; (vii) four-dimension indexing; (viii) left to right, top to bottom element/section flow are the first two spatial dimensions; (ix) the third dimension is also spatial dimension, which is built by recognizing a group of elements and represents a hierarchy serial number; (x) time dimension as the fourth dimension; (xi) time represents that the serial number is dynamic and updated with the UI change; (xii) that's to say, the serial number for the same element will be changed in different operation contexts; and (xiii) maintained by indexing refresh mark in script, which will cause re-indexing during script running.

Some embodiments of the present invention may include one, or more, of the following operations, features, characteristics and/or advantages: (i) the element indexing process; (ii) identify groups of elements/sections in current UI screen based on the corresponding image recognition model (such as menu/tool/navigation bar, form, table etc.); (iii) identify interactive elements in each section and the screen based on the corresponding image recognition model (such as button, text area, menu item etc.); (iv) index each element with a serial number based on the first three dimension; (v) simple flow indexing—plane flow serial number; (vi) distinguish the interaction elements and index them in sequence from left to right, from top to bottom; (vii) for example, in an example English GUI screen, elements are indexed with ID #1 to #4 from left to right, from top to bottom; (vii) a corresponding national language support (NLS) Screen, a stand in for other alternative language GUI screens, is also indexed according to same rule; (viii) in this way, English and NLS elements can be matched faster and more effective and convenient; (ix) moreover, this greatly improves the efficiency of developing GUI automation scripts; (x) hierarchy flow indexing—hierarchy flow serial number; (xi) for elements located in a composite section, a hierarchy index is needed; (xii) in an example GUI, the layout of the GUI page changes due to the length of the translated content when switching from a first language to a second language; (xiii) if simple indexing is used, the positions of elements can sometimes change due to the length of the translated text encompassed by the element; (xiv) this causes inconsistent elements-mapping between English and NLS screens; and (xv) after the adoption of the hierarchy flow indexing, elements in one composite section of an English screen will be categorized as a group.

Figure 5:
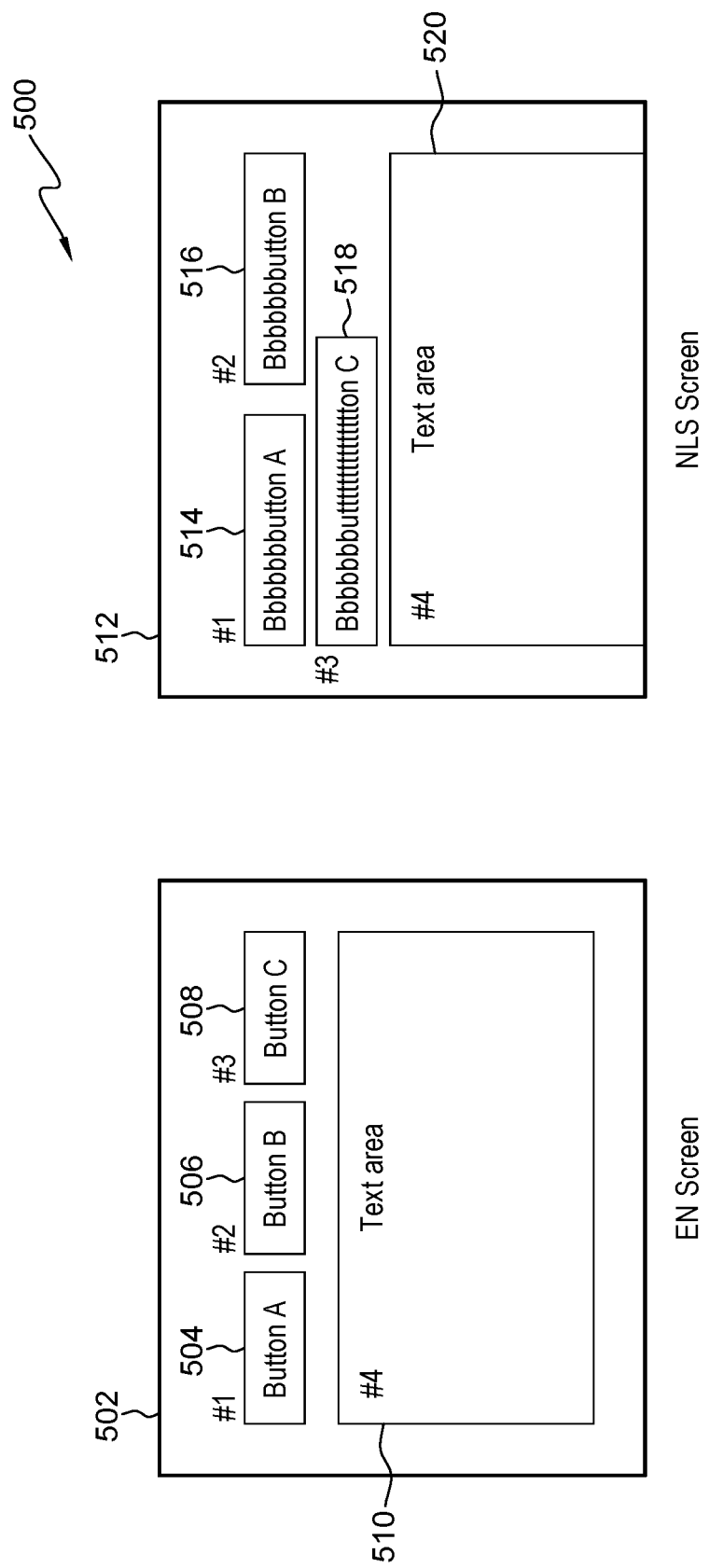
FIG. 5 is a screenshot view generated by a second embodiment system.

According to a second embodiment of the present invention, screenshot 500 of FIG. 5 shows a screenshot generated by the second embodiment which includes: (i) English GUI 502; (ii) Button A 504; (iii) Button B 506; (iv) Button C 508; (v) text area 510; (vi) NLS GUI 512; (vii) NLS translated Button A 514; (viii) NLS translated Button B 516; (ix) NLS translated Button C 518; and (x) NLS translated text area 520. As shown in this screenshot, the elements of English GUI 502 and NLS GUI 512 have been indexed with a simple index, from left to right and top to bottom. While the layout of the buttons has changed due to the translation from English (EN) to NLS, the index is consistent for each element between each GUI.

Figure 6:
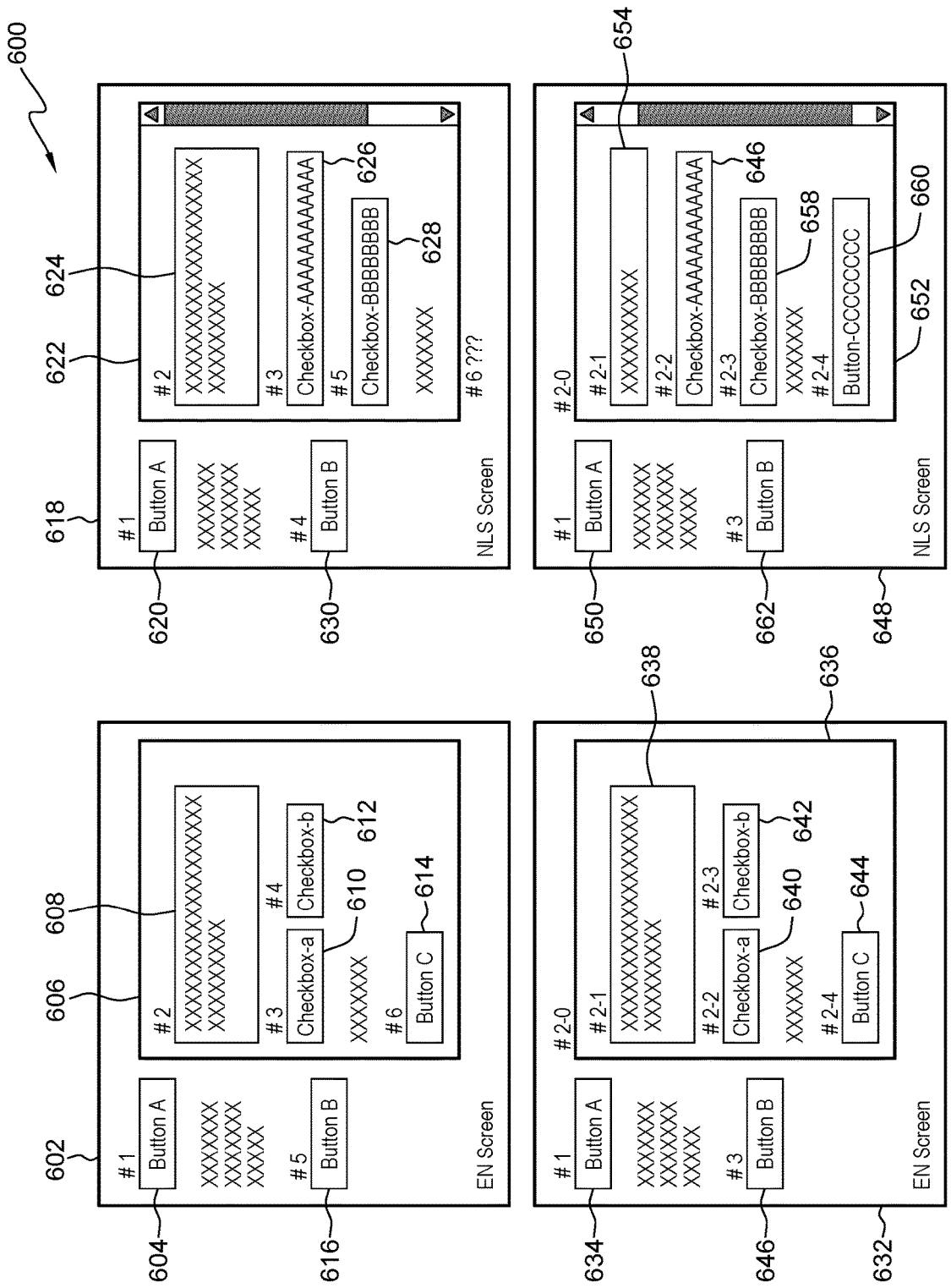
FIG. 6 is a screenshot view generated by a third embodiment system.

Screenshot 600 of FIG. 6 shows: (i) English GUI screen 602; (ii) NLS GUI screen 618; (iii) English GUI screen 632; and (iv) NLS GUI screen 648. English GUI screen 602, with interface elements indexed using a basic index of left to right, top to bottom, includes: (i) Button A 604; (ii) element group 606; (iii) text box 608; (iv) Checkbox-a 610; (v) Checkbox-b 612; (vi) Button C 614; and (vii) Button B 616. NLS GUI screen 618, which corresponds to a non-English translation of English GUI screen 602, also includes interface elements indexed using a basic index of left to right, top to bottom, including: (i) Button A 620; (ii) element group 622; (iii) text box 624; (iv) Checkbox-AAAAAAAAAAAA 626; (v) Checkbox-BBBBBBBB 628; and (vi) Button B 630. English GUI screen 632, which includes elements indexed using a four dimensional index according to an embodiment of the present invention, including the following elements: (i) Button A 634; (ii) Element group 636; (iii) text box 638; (iv) Checkbox-a 640; (v) Checkbox-b 642; (vi) Button C 644; and (vii) Button B 646. NLS GUI screen 648, which corresponds to a non-English translation of English GUI screen 632, also includes elements indexed using a four dimensional index according to an embodiment of the present invention, including the following elements: (i) Button A 650; (ii) element group 652; (iii) text box 654; (iv) Checkbox-AAAAAAAAAAAA 656; (v) Checkbox-BBBBBBBB 658; (vi) Button CCCCCCCC 660; and (vii) Button B 662.

As shown in FIG. 6, if simple indexing is used (such as in English GUI screen 602 and NLS GUI screen 618), based on the rule, the element 'Checkbox-b' is marked #4 in the English UI (shown as Checkbox-b 612), however in translated (NLS) UI it is marked #5 (shown as Checkbox-BBBBBBBB 628) since the position has changed due to the translation. This causes inconsistent elements-mapping between EN (or English) and NLS screen. After the adoption of Hierarchy Flow Indexing (as in some embodiments of the present invention), the elements in the right composite section (or element group) of EN Screen will be categorize as a group, the index ID marked as #2-1, #2-2, etc. from left to right, from top to bottom, as shown in English GUI screen 632, with elements textbox 638 and Checkbox-a 640. As shown in English GUI screen 632 and NLS GUI screen 648, the other two elements present outside of element group 636 and 652, respectively, are indexed as #1, #3 by using simple indexing. By adopting this technique, the elements index in both EN and NLS UI screens can be kept consistent.

Screenshot 700A of FIG. 7A shows an example English GUI indexed according to Hierarchy Flow Indexing according to an embodiment of the present invention, including English GUI screen 702A.

Flowchart 700B of FIG. 7B shows a method for composing UI placement test cases according to an embodiment of the present invention, corresponding to English GUI screen 702A, including the following steps: (i) 704B Image recognition 704B; (ii) Element indexing 706B; and (iii) Indexing Display 708B.

Screenshot 700C of FIG. 7C includes code block 710C, corresponding to an example portion of code corresponding to the method for composing test cases shown in the flowchart illustrated in FIG. 7B.

Figure 8A:
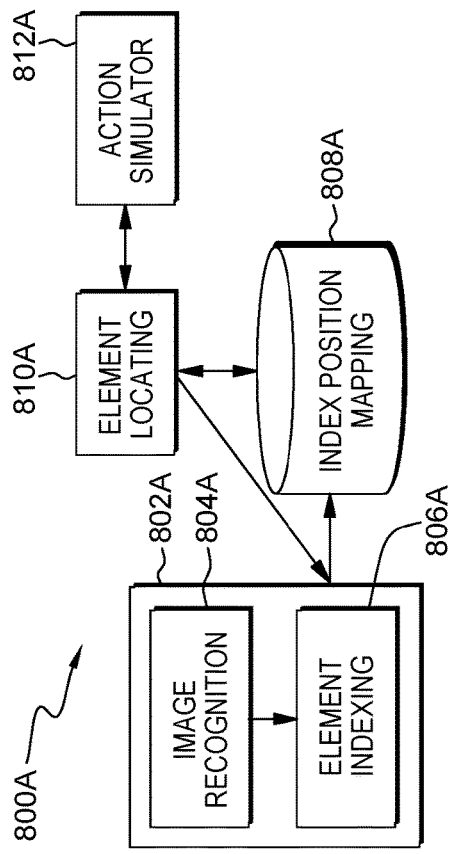
FIG. 8A is a flowchart showing a third embodiment method.

Flowchart 800A of FIG. 8A shows a flowchart of a method for executing a UI placement test cases according to an embodiment of the present invention, including: (i) image recognition and indexing group 802A; (ii) image recognition module 804A; (iii) element indexing module 606A; (iv) index position mapping database 808A; (v) element locating module 810A; and (vi) action simulator module 812A.

Figure 8B:
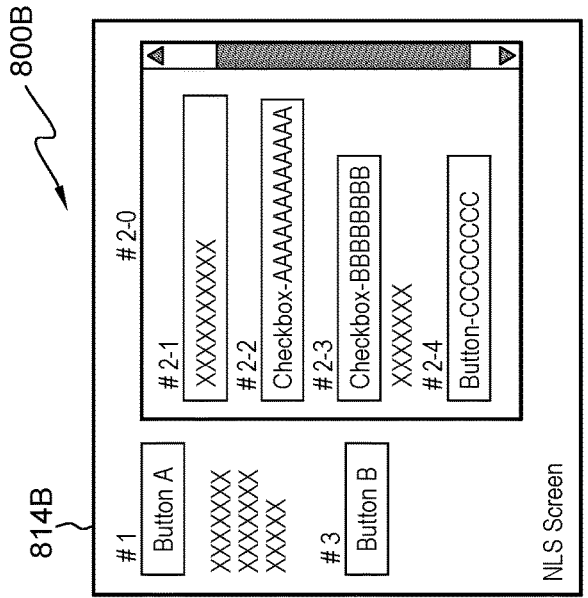
FIG. 8B is a screenshot view generated by the third embodiment method.

Screenshot 800B of FIG. 8B illustrates an example NLS GUI screen 814B indexed in an example test case according to the flowchart of FIG. 8A.

Figure 8C:
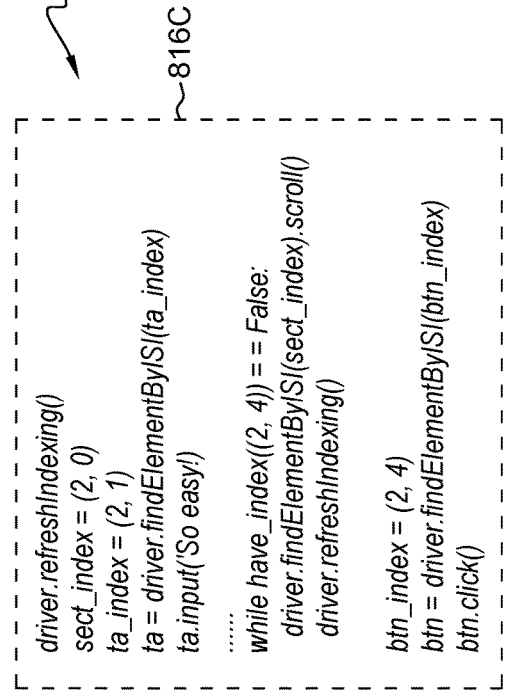
FIG. 8C is a screenshot view showing a block of code corresponding to the third embodiment method.

Screenshot 800C of FIG. 8C includes code block 816C, corresponding to an example portion of code corresponding to the method for executing UI placement test cases shown in the flowchart illustrated in FIG. 8A.

Figure 9:
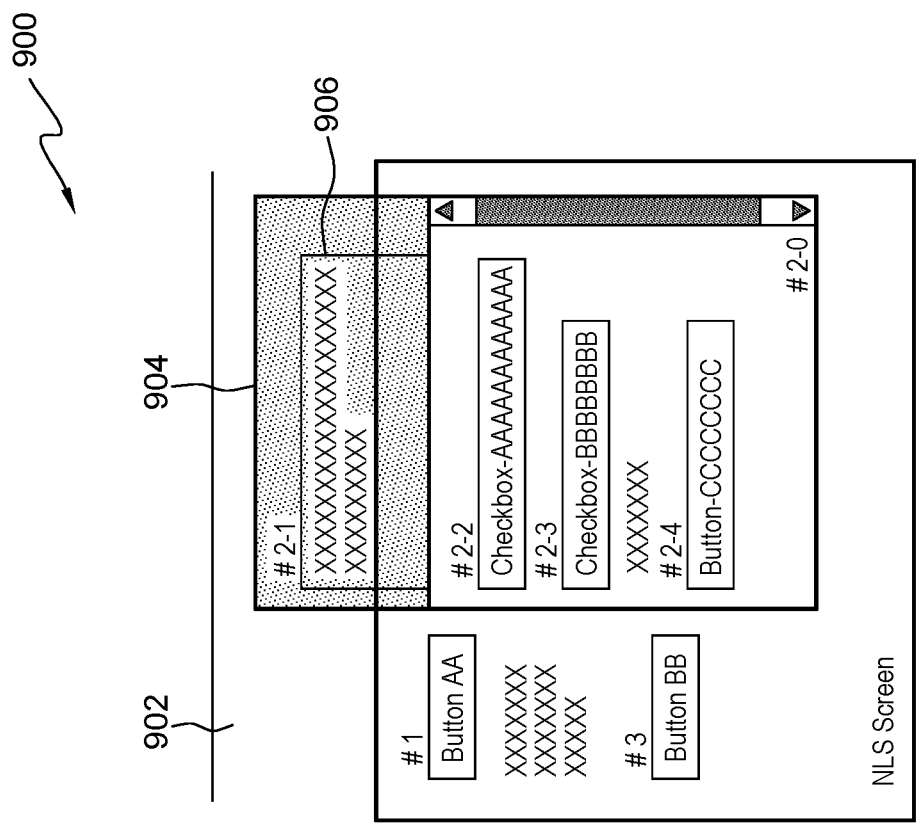
FIG. 9 is a screenshot view generated by the third embodiment method.

Screenshot 900 of FIG. 9 shows an example NLS GUI screen 902 illustrating an exploratory scroll function for locating indexed UI elements that are not visually present in the user interface due to scrolling or other causes. When retrieving the mapping table, if a specific serial number or index is not found, an exploratory operation is called, which can scroll up or down to get a full virtual map of the section (shown as 904), where text box 906 is located based on its index of 2-1.

Some embodiments of the present invention may include one, or more, of the following operations, features, characteristics and/or advantages: (i) through analyzing the current UI, the interactive elements can be recognized and indexed with hierarchy flow serial number; (ii) highlight the serial number in current UI on the fly; (iii) using the serial number as locator to locate the elements in automation test scripts; (iv) if former scripts has led to UI change and re-indexing needed, an indexing refresh mark should be used in the script, such as "driver.refreshIndexing( )" shown in code block 710 of screenshot 700 of FIG. 7; (v) locating process during test case executing; (vi) when running to the refresh indexing mark, analyze the current UI and index the interactive elements with hierarchy flow serial number; (vii) once indexing is completed, store the mapping table between the serial number and position of elements for current UI; (viii) when retrieving the mapping table, if a specific serial number is not found, an exploratory operation can be called, which can scroll up or down to get a full virtual map of the section; (ix) here is a problem, not all of the elements on the English page can be displayed on the NLS page since the layout of the NLS page has changed after translation; (x) for example as shown in FIG. 6, element "button CCCCCC" (the NLS translation of Button C 614) becomes invisible in NLS GUI 618 because the positions of the preceding two checkboxes (626 and 628) have changed; (xi) to overcome this problem, an exploratory scroll operation and concepts of virtual map and visible window are proposed; (xii) from this point of view, two extra attributes are given to the serial number, (a) "if found in current mapping" and (b) "if visible in current screen"; (xii) the serial number is assigned based on the full virtual map of the section; (xiii) elements which have been scrolled out of the current visible window becomes invisible and unable to be located (throw exception); (xiv) retrieve the element position by searching the requested serial number; and (xv) locate the element with actual position in real time in simulated action as shown blocks 810 and 812 of the screenshot 800 of FIG. 8.

Some embodiments of the present invention may include one, or more, of the following operations, features, characteristics and/or advantages: (i) a user controllable, explicit way demonstrated to solve this indexing inconsistent problem caused by translation or screen resolution change in runtime; (ii) some assurance code is included to ensure the potential missing indexed elements to be indexed (usually for the last few elements in an element group, such as index (2,4) as shown in code block 710C of FIG. 7C and code block 816C of FIG. 8C); (iii) alternatively, such assurance code can be integrated into an element find function such as in the following example code block:

```
function findElementByISI(index, explore=False):
   if explore:
      groupIndex = getGroupIndex(index)
      while have__index(index) not True:
         driver.findElementByISI(groupIndex).scroll( )
         driver.refreshIndexing(TBC=True)
   return findElementByISI(index)
```

In the above example code block, using index (2,4) as an example (as in code block 710C of FIG. 7C and code block 816C of FIG. 8C), the variable groupindex provides the index values describing the group an element belongs to, such as "2" in this example, where the element is the 4$^{th}$ element of group 2. The conditional "if explore" which corresponds to if the variable "explore" has a boolean value of "true", indicates that an automated scroll function is enabled for this findElementBylSl function, while "TBC=True" indicates that the second layer serial number in the group will be continued (with the second layer corresponding to the "4" in the (2,4) index, sometimes referred to as a serial number).

Some embodiments of the present invention may include one, or more, of the following operations, features, characteristics and/or advantages: (i) to overcome above limitations, this technique leverages two image recognition models; (ii) one is for elements and the other is for element groups; (iii) furthermore, this technique leverages image recognition to identify interactive elements and element groups and index them with hierarchy flow serial numbers; (iv) to be specific, the numbering is from left to right, up to down and layered; (v) the number is dynamic and updated with the UI changes simultaneously; (vi) that is, four-dimensional indexing; (vii) the technique does not locate elements simply by image or position; (viii) it indexes elements based on the relative positions of element image during composing and executing test scripts, and the indexing consistency between script and run-time is maintained by an indexing refresh mark in script; (ix) most importantly, at run-time the element is located by the actual position of the element's image which has the corresponding indexing number; (x) one-to-one correspondence for elements during the composing and executing test scripts is kept by above four-dimensional indexing number; (xi) the actual position of element is retrieved by the number at run-time; and (xii) as a result, the limitations of existing solutions are overcome.

Some embodiments of the present invention may include one, or more, of the following operations, features, characteristics and/or advantages: (i) four-dimensional indexing based on image recognition is proposed for locating elements; (ii) left to right, up to down numbering mechanism represents the first two dimensions; (iii) hierarchy numbering mechanism for elements in element groups represents the third dimension; (iv) time as the fourth dimension, which represents that the serial number is dynamic and updated with the UI change simultaneously; (v) the actual element position is determined by the element image which has the corresponding indexing number at run-time; and (vi) exploratory operations are proposed to overcome the UI change caused by translation.

Some embodiments of the present invention may include one, or more, of the following operations, features, characteristics and/or advantages: (i) the indexing number will be visually displayed in the interface; (ii) can be used as locator directly, without having to study the DOM tree and write complex CSS selectors and XPATH locator, or take a screenshot or obtain the location of the element, which is very easy to use; (iii) does not rely on text locators so no need to deal with the issue caused by locator translation; (iv) thus provides a more efficient solution for translation verification test; (v) this locating technique obtains the element position at run-time according to the image index, so it can be widely used and robust for almost all kinds of test, such as translation verification test, cross-platform test, or slight interface change regression test.

Some embodiments of the present invention may include one, or more, of the following operations, features, characteristics and/or advantages: (i) getting rid of traditional position based, image comparison based, elements attributes and structure based locating solution directly; (ii) leverage image recognition to identify elements and element groups, and then number them logically with four dimensions; (iii) it is a What You See Is What You Get (or WYSIWYG, for short) solution, thus at development, a stable and unique locator is quickly achieved; (iv) it is independent with development framework and can apply to any testing tool; (v) this technique is better than the prior art in view of implementation complexity, reliability, performance, and user experience; (vi) adapt changes in the text content, such as in a multilingual test environment; (vii) distinguish between two or more UI elements with the same local structure using overall index info; (viii) leveraging image recognition to identify elements and element groups and builds a four-dimension structure to identify elements; (ix) but not based on textual content; (x) therefore, it can be adapted to multilingual environments, and it can also be adapted to situations where multiple identical texts exist in the same GUI; (xi) a new UI locating method aimed to locate elements by the hierarchy relative location of the element image by four-dimensional indexing; (xii) locate GUI elements by four-dimensional indexing based on image recognition; (xiii) the actual element position will be calculated based on the four dimensional index in runtime; (xiv) and an exploratory operation is proposed to overcome the UI change caused by translation; (xv) thoroughly solve the problem which the prior art tried to using a light weight and easy to use solution; (xvi) it locates GUI elements by four-dimensional indexing based on image recognition; (xvii) locator is highlighted with a serial number on the fly; and (xviii) it overcomes the additional burden of text locator translation problems in multilingual environments, and is more efficient and easier to use.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) comprising:
   receiving a first graphical user interface, including a first plurality of graphical user interface elements;
   receiving a machine learning model trained to determine positions of groups of user interface elements and their corresponding constituent user interface elements in an image of a graphical user interface, wherein a serial number assigned to each of the corresponding constituent user interface elements are highlighted on the fly;
   indexing, into a first position mapping table, each graphical user interface element of the first plurality of graphical user interface elements with a multidimensional index value corresponding to at least three dimensions based, at least in part, on the machine learning model, where at least one dimension of the at least three dimensions corresponds to grouping status within a hierarchical group of elements, and wherein the multidimensional index value comprises: (i) a first dimension indicative of horizontal position on the first graphical user interface, (ii) a second dimension comprising vertical position on the first graphical user interface, and (iii) a third dimension corresponding to relative placement within the hierarchical group of elements;
   testing the first graphical user interface with a first automated graphical user interface test, where the first automated graphical user interface test locates graphical user interface elements for testing based, at least in part, on the serial number as a locator to locate the corresponding constituent user interface elements on the first position mapping table; and
   applying a scrolling technique to generate an expanded virtual graphical user interface of one or more groups of user interface elements, wherein the machine learning model refreshes the multidimensional index values using the expanded virtual graphical user interface to reveal other graphical user interface elements not previously visible by: analyzing the expanded virtual graphical user interface (GUI) to identify newly revealed GUI elements; determining positions and hierarchical relationships of the newly revealed GUI elements; and updating the first position mapping table with new multidimensional index values for the newly revealed GUI elements, wherein the new multidimensional index values maintain consistency with an indexing scheme of previously indexed elements while incorporating the newly revealed elements into a hierarchical structure.

2. The CIM of claim 1, wherein the multidimensional index value further includes a fourth dimension corresponding to a version of the first graphical user interface, where different versions of the first graphical user interface correspond to changes to the first graphical user interface.

3. The CIM of claim 1, wherein the first automated graphical user interface test further comprises:
executing a first user interface test simulating user interaction between at least some of the first plurality of graphical user interface elements by simulating user input with the first graphical user interface, where the first plurality of graphical user interface elements are located by their respectively assigned multidimensional index value in the first position mapping table.

4. The CIM of claim 1, further comprising:
receiving a second graphical user interface, based, at least in part, on the first graphical user interface, including a second plurality of graphical user interface elements, where at least some of the second plurality of graphical user interface elements correspond to each of the graphical user interface elements of the first plurality of graphical user interface elements;
indexing, into a second position mapping table, each graphical user interface element of the second plurality of graphical user interface elements with a multidimensional index value corresponding to at least three dimensions based, at least in part, on the machine learning model, where at least one dimension of the at least three dimensions corresponds to grouping status within a hierarchical group of elements; and
testing the second graphical user interface with the first automated graphical user interface test, where the first automated graphical user interface test locates graphical user interface elements based, at least in part, on the second position mapping table.

5. The CIM of claim 4, further comprising:
while testing the second graphical user interface with the first automated graphical user interface test, responsive to the first graphical user interface test requesting an index absent from the second position mapping table, generating a virtual map of the second graphical user interface by scrolling at least some portions of the second graphical user interface in one or more directions, where the virtual map includes at least some graphical user interface elements of the second plurality of graphical user interface elements which were not visible on the second graphical user interface when previously indexed.

6. A computer program product (CPP) comprising:
a machine readable storage device; and
computer code stored on the machine readable storage device, with the computer code including instructions for causing a processor set to perform operations including the following:
receiving a first graphical user interface, including a first plurality of graphical user interface elements,
receiving a machine learning model trained to determine positions of groups of user interface elements and their corresponding constituent user interface elements in an image of a graphical user interface, wherein a serial number assigned to each of the corresponding constituent user interface elements are highlighted on the fly;
indexing, into a first position mapping table, each graphical user interface element of the first plurality of graphical user interface elements with a multidimensional index value corresponding to at least three dimensions based, at least in part, on the machine learning model, where at least one dimension of the at least three dimensions corresponds to grouping status within a hierarchical group of elements, and wherein the multidimensional index value comprises: (i) a first dimension indicative of horizontal position on the first graphical user interface, (ii) a second dimension comprising vertical position on the first graphical user interface, and (iii) a third dimension corresponding to relative placement within the hierarchical group of elements;
testing the first graphical user interface with a first automated graphical user interface test, where the first automated graphical user interface test locates graphical user interface elements for testing based, at least in part, on the serial number as a locator to locate the corresponding constituent user interface elements on the first position mapping table; and
applying a scrolling technique to generate an expanded virtual graphical user interface of one or more groups of user interface elements, wherein the machine learning model refreshes the multidimensional index values using the expanded virtual graphical user interface to reveal other graphical user interface elements not previously visible by: analyzing the expanded virtual graphical user interface (GUI) to identify newly revealed GUI elements; determining positions and hierarchical relationships of the newly revealed GUI elements; and updating the first position mapping table with new multidimensional index values for the newly revealed GUI elements, wherein the new multidimensional index values maintain consistency with an indexing scheme of previously indexed elements while incorporating the newly revealed elements into a hierarchical structure.

7. The CPP of claim 6, wherein the multidimensional index value further includes a fourth dimension corresponding to a version of the first graphical user interface, where different versions of the first graphical user interface correspond to changes to the first graphical user interface.

8. The CPP of claim 6, wherein the first automated graphical user interface test further comprises:
executing a first user interface test simulating user interaction between at least some of the first plurality of graphical user interface elements by simulating user input with the first graphical user interface, where the first plurality of graphical user interface elements are located by their respectively assigned multidimensional index value in the first position mapping table.

9. The CPP of claim 6, wherein the computer code further includes instructions for causing the processor set to perform the following operations:
receiving a second graphical user interface, based, at least in part, on the first graphical user interface, including a second plurality of graphical user interface elements, where at least some of the second plurality of graphical user interface elements correspond to each of the graphical user interface elements of the first plurality of graphical user interface elements;
indexing, into a second position mapping table, each graphical user interface element of the second plurality of graphical user interface elements with a multidimensional index value corresponding to at least three dimensions based, at least in part, on the machine learning model, where at least one dimension of the at least three dimensions corresponds to grouping status within a hierarchical group of elements; and
testing the second graphical user interface with the first automated graphical user interface test, where the first automated graphical user interface test locates graphical user interface elements based, at least in part, on the second position mapping table.

10. The CPP of claim 9, wherein the computer code further includes instructions for causing the processor set to perform the following operations:

while testing the second graphical user interface with the first automated graphical user interface test, responsive to the first graphical user interface test requesting an index absent from the second position mapping table, generating a virtual map of the second graphical user interface by scrolling at least some portions of the second graphical user interface in one or more directions, where the virtual map includes at least some graphical user interface elements of the second plurality of graphical user interface elements which were not visible on the second graphical user interface when previously indexed.

11. A computer system (CS) comprising:
a processor set;
a machine readable storage device; and
computer code stored on the machine readable storage device, with the computer code including instructions for causing the processor set to perform operations including the following:
receiving a first graphical user interface, including a first plurality of graphical user interface elements,
receiving a machine learning model trained to determine positions of groups of user interface elements and their corresponding constituent user interface elements in an image of a graphical user interface, wherein a serial number assigned to each of the corresponding constituent user interface elements are highlighted on the fly;
indexing, into a first position mapping table, each graphical user interface element of the first plurality of graphical user interface elements with a multidimensional index value corresponding to at least three dimensions based, at least in part, on the machine learning model, where at least one dimension of the at least three dimensions corresponds to grouping status within a hierarchical group of elements, and wherein the multidimensional index value comprises: (i) a first dimension indicative of horizontal position on the first graphical user interface, (ii) a second dimension comprising vertical position on the first graphical user interface, and (iii) a third dimension corresponding to relative placement within the hierarchical group of elements;
testing the first graphical user interface with a first automated graphical user interface test, where the first automated graphical user interface test locates graphical user interface elements for testing based, at least in part, on the serial number as a locator to locate the corresponding constituent user interface elements on the first position mapping table; and
applying a scrolling technique to generate an expanded virtual graphical user interface of one or more groups of user interface elements, wherein the machine learning model refreshes the multidimensional index values using the expanded virtual graphical user interface to reveal other graphical user interface elements not previously visible by: analyzing the expanded virtual graphical user interface (GUI) to identify newly revealed GUI elements; determining positions and hierarchical relationships of the newly revealed GUI elements; and updating the first position mapping table with new multidimensional index values for the newly revealed GUI elements, wherein the new multidimensional index values maintain consistency with an indexing scheme of previously indexed elements while incorporating the newly revealed elements into a hierarchical structure.

12. The CS of claim 11, wherein the multidimensional index value further includes a fourth dimension corresponding to a version of the first graphical user interface, where different versions of the first graphical user interface correspond to changes to the first graphical user interface.

13. The CS of claim 11, wherein the first automated graphical user interface test further comprises:
executing a first user interface test simulating user interaction between at least some of the first plurality of graphical user interface elements by simulating user input with the first graphical user interface, where the first plurality of graphical user interface elements are located by their respectively assigned multidimensional index value in the first position mapping table.

14. The CS of claim 11, wherein the computer code further includes instructions for causing the processor set to perform the following operations:
receiving a second graphical user interface, based, at least in part, on the first graphical user interface, including a second plurality of graphical user interface elements, where at least some of the second plurality of graphical user interface elements correspond to each of the graphical user interface elements of the first plurality of graphical user interface elements;
indexing, into a second position mapping table, each graphical user interface element of the second plurality of graphical user interface elements with a multidimensional index value corresponding to at least three dimensions based, at least in part, on the machine learning model, where at least one dimension of the at least three dimensions corresponds to grouping status within a hierarchical group of elements; and
testing the second graphical user interface with the first automated graphical user interface test, where the first automated graphical user interface test locates graphical user interface elements based, at least in part, on the second position mapping table.

15. The CS of claim 14, wherein the computer code further includes instructions for causing the processor set to perform the following operations:
while testing the second graphical user interface with the first automated graphical user interface test, responsive to the first graphical user interface test requesting an index absent from the second position mapping table, generating a virtual map of the second graphical user interface by scrolling at least some portions of the second graphical user interface in one or more directions, where the virtual map includes at least some graphical user interface elements of the second plurality of graphical user interface elements which were not visible on the second graphical user interface when previously indexed.

* * * * *